United States Patent [19]

Kikuchi

[11] Patent Number: 4,903,001
[45] Date of Patent: Feb. 20, 1990

[54] DETECTING ELEMENT USING AN ELECTRICALLY RESISTIVE BODY, FOR DETERMINING A PARAMETER

[75] Inventor: Toru Kikuchi, Nagoya, Japan
[73] Assignee: NGK Insulators, Ltd., Nagoya, Japan
[21] Appl. No.: 216,100
[22] Filed: Jul. 7, 1988

[30] Foreign Application Priority Data

Jul. 13, 1987 [JP] Japan .................. 62-174251

[51] Int. Cl.⁴ .................. B05D 5/12; G01F 1/68
[52] U.S. Cl. .................. 338/22 R; 338/274;
73/204.25
[58] Field of Search .................. 73/204.14, 204.25;
338/22, 270, 273, 274, 302; 361/302, 321

[56] References Cited

U.S. PATENT DOCUMENTS

| | | | |
|---|---|---|---|
| 2,904,618 | 9/1959 | Robinson et al. | 338/274 X |
| 3,197,728 | 7/1965 | Wright | 338/274 |
| 3,926,702 | 12/1975 | Oki et al. | 264/58 X |
| 3,982,218 | 9/1976 | Adler et al. | 338/22 R |
| 4,513,615 | 4/1985 | Sato et al. | 73/204.25 |
| 4,753,902 | 6/1988 | Ketcham | 501/98 X |
| 4,755,491 | 7/1988 | Miwa | 501/98 X |

FOREIGN PATENT DOCUMENTS 2918613 11/1980 Fed. Rep. of Germany .
96326 12/1979 Japan .
59-65216 4/1984 Japan .

*Primary Examiner*—Donald A. Griffin
*Attorney, Agent, or Firm*—Arnold, White & Durkee

[57] ABSTRACT

A detecting element for determining a parameter, including an electrically resistive body formed on a surface of a support, a conductor electrically connected to the resistive body, and a bonding member for securing the conductor to the support. The bonding member has a low-conductivity portion having a lower thermal conductivity than a remainder thereof, to minimize heat transfer from the resistive body to the conductor via the bonding member.

21 Claims, 2 Drawing Sheets

DETECTING ELEMENT USING AN ELECTRICALLY RESISTIVE BODY, FOR DETERMINING A PARAMETER

BACKGROUND OF THE INVENTION

1. Field of the Invention

The present invention relates in general to a detecting element, and more particularly to a detecting element utilizing temperature dependence of an electrically resistive body, such as a thermal flow meter suitable for determining, for example, a flow rate or velocity of a fluid flowing in an internal combustion engine.

2. Discussion of the Prior Art

A detecting element such as a thermal flow meter which utilizes temperature dependence of an electric resistor is known. An example of this type of detecting element is disclosed in laid-open publication No. 56-96326 of unexamined Japanese Utility Model Application. This detecting element includes a heat-generating electrically resistive body formed on a support in the form of a tube or rod. Electrical conductors or leads which are electrically connected to the resistive body are secured to opposite ends of the support, by using a platinum paste, so that the strength of the connections between the conductors and the support is increased to improve the durability of the detecting element.

A flow meter employing the detecting element of the type described above suffers from a problem that heat produced by the resistive body, which should be dissipated into a fluid to be measured, tends to be transferred to or absorbed by the conductors, since a material such as a platinum paste having a comparatively high thermal conductivity is interposed as a bond between the conductors and the support which bears the resistive body. This tendency leads to reduced detecting accuracy of the meter because the temperature of the resistive body does not accurately correspond to the flow rate or velocity of the fluid to be measured. Further, the above tendency increases an initial operating time between the moment of commencement of energization of the electrically resistive body and the moment at which the detecting accuracy of the meter is stabilized.

SUMMARY OF THE INVENTION

It is therefore an object of the present invention to provide a detecting element which overcomes the problems encountered in the prior art and which has improved detecting accuracy.

Another object of the invention is to provide such a detecting element suitably used as a thermal flow meter, which has improved detecting accuracy and initial operating performance.

The above objects may be achieved according to the principle of the present invention, which provides a detecting element for determining a parameter, comprising: a support having a bearing surface, an electrically resistive body formed on the bearing surface of the support, conductor means electrically connected to the electrically resistive body, and bonding means for securing the conductor means to the support. The bonding means comprises a low-conductivity portion having a lower thermal conductivity than a remainder thereof.

In the detecting element of the present invention constructed as described above, the presence of the low-conductivity portion in the bonding means reduces the overall value of thermal conductivity of the bonding means, and therefore effectively minimizes or prevents dissipation of the heat of the resistive body to the conductor means via the bonding means. Accordingly, the detecting accuracy and initial operating performance of the detecting element is improved.

In one form of the present invention, the remainder of the bonding means consists of a glass or a glass ceramic. In another form of the invention, the bonding means consists of a porous glass which has pores formed therein as the low-conductivity portion. The porous glass may have a porosity of 10–80%, preferably 10–70%. In this case, the overall weight or mass of the detecting element is reduced, and the operating response is improved.

In a further form of the invention, the remainder of the bonding means consists of a glass, and the low-conductivity portion consists of an inorganic particulate material such as zirconia or similar ceramics scattered in the glass. In a still further form of the invention, the remainder of the bonding means consists of a glass, while the low-conductivity portion consists of pores formed in the glass and an inorganic particular material as indicated above. In this case, the detecting accuracy, initial operating performance, and durability of the detecting element are further improved.

The support may be formed of a ceramic material such as alumina or aluminum nitride.

In a yet further form of the invention, the support consists of a cylindrical member which has, a circumferential outer surface on which the electrically resistive body is formed. The cylindrical member has a bore in which the bonding means exists for securing the conductor means to the cylindrical member. In this case, the bore may be formed through the cylindrical member, and the conductor means consists of two conductors whose end portions are inserted into open end portions of the bore.

In the above form of the invention, the detecting element may further comprise two connectors for connecting opposite ends of the electrically resistive body to the two conductors, respectively. The connectors may preferably have a low-conductivity portion which has a lower thermal conductivity than a remainder thereof.

Alternatively, the bore formed in the cylindrical support member may be closed at one of opposite ends of the support member and open at the other end. In this case, the conductor means consists of a single conductor whose end portion is inserted into an open end portion of the bore. In this arrangement, too, connector means for connecting opposite ends of the electrically resistive body to the single conductor may have a low-conductivity portion which has a lower thermal conductivity than a remainder thereof.

In another form of the invention, the support comprises of a pair of planar members which are spaced apart from each other by the bonding means, and the electrically resistive body comprises two separate members each formed on one of opposite major surfaces of a corresponding one of the two planar members. The conductor means consists of two conductors whose end portions are embedded in opposite end portions of the bonding means disposed between the other major surfaces of the two planar members. In this case, the detecting element may further comprise two connectors for connecting the opposite ends of the two planar members to the two connectors, respectively.

BRIEF DESCRIPTION OF THE DRAWINGS

The foregoing and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
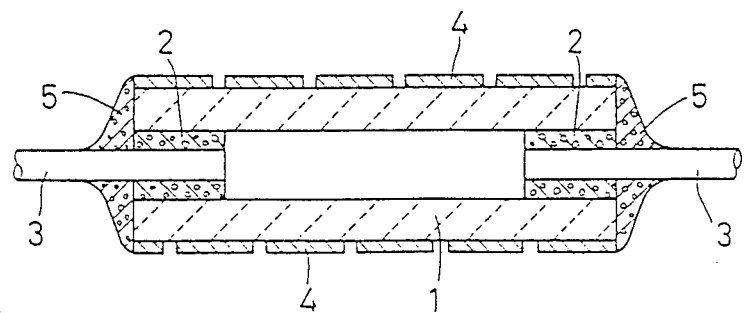
FIGS. 1, 2 and 3 are schematic elevational views in longitudinal cross section of different embodiments of a detecting element of this invention, respectively.

Referring first to the cross sectional view of FIG. 1, there is illustrated the first embodiment of the detecting element of the present invention, which is adapted to be suitably used as a thermal flow meter. In the figure, reference numeral 1 denotes a cylindrical support formed of alumina. A pair of electrical conductors or lead wires 3, 3 made of platinum are inserted suitable distances at their end portions in respective end portions of a central bore of the cylindrical support 1, and secured to the inner surface of the support 1 by bonding means in the form of glass fillers 2, 2 each of which has pores formed therein. The cylindrical support 1 has an outer circumferential bearing surface on which a thin platinum layer 4 having a suitable width is formed in a spiral manner. This platinum layer 4 serves as an electrically resistive body of the detecting element. On the opposite end faces of the cylindrical support 1 and the corresponding end faces of the glass fillers 2, 2, there are provided platinum connectors 5, 5 which are formed by baking a platinum paste (electrically conductive paste including platinum as a major component) such that the connectors have pores therein. These connectors 5, 5 function to electrically connect the conductors 3, 3 to the electrically resistive platinum layer 4.

In the thus constructed detecting element, the cylindrical support 1 has suitable dimensions, for example, an outer diameter of 0.5 mm, an inside diameter of 0.2 mm, and a length of 2 mm. The platinum layer 4 may be formed by first applying a platinum film by an ordinary sputtering technique over the entire area of the outer circumferential surface of the cylindrical support 1, and then trimming the platinum film by a laser such that the platinum layer 4 is defined by a spiral groove formed in the platinum film. To secure the platinum conductors 3, 3 in the central bore of the support 1, a glass paste (2) including a suitable foaming agent is applied to the opposite open end portions of the inner surface of the support 1, and the platinum conductors in the form of wires having a diameter of 0.15 mm are inserted into the opposite end portions of the support 1 over suitable distances. The masses (2, 2) of the glass paste filling the annular spaces between the conductors 3, 3 and the inner surface of the support 1 are then dried.

Subsequently, a platinum paste (5) which is a mixture of a platinum powder, a glass powder and a foaming agent is applied to the opposite end faces of the cylindrical support 1 and the corresponding ends of the dried glass paste masses (2, 2), such that the platinum paste masses (5, 5) contact the corresponding ends of the spiral platinum layer 4, for electrical conduction between the conductors 3, 3 and the platinum layer 4. It will be understood that the glass paste masses (2, 2) applied to the opposite end portions of the central bore of the cylindrical support 1 effectively prevent an electrical short-circuiting within the bore, which would otherwise occur due to a flow of the applied platinum paste masses (5, 5) into the bore. Further, the glass paste masses (2, 2) which tentatively fix the platinum conductors 3, 3 facilitate the procedure to apply the platinum paste (5).

The thus prepared assembly of the cylindrical support 1 of alumina with the electrical conductors 3, 3 tentatively secured thereto is fired under suitably selected conditions, for example, in an oxidizing atmosphere at a temperature of 600°–1100° C. for a period of 10–30 minutes, whereby the applied glass paste masses (2, 2) and platinum paste masses (5, 5) are fired into the glass fillers 2, 2 and platinum connectors 5, 5. The ratios of the pores present in the glass fillers (fired glass paste masses 2, 2) and in the platinum connectors (fired platinum paste masses 5, 5) may be adjusted to within desired ranges, by controlling the amount of inorganic components included in the glass paste and platinum paste, and by adjusting the firing conditions. In this manner, a pre-adjusted form of the detecting element is prepared.

The thus obtained pre-adjusted detecting element is then subjected to an adjustment of the electrical resistance of the electrically resistive body, i.e., platinum layer 4. This adjustment can be made, for example, by applying a controlled thickness of an additional platinum coating to the platinum layer 4, for example, by electroplating, as disclosed in Japanese Patent Application No. 61-103178. The platinum layer 4 and the cylindrical support 1 may be covered by a protective coating such as a glass coating, for improved durability and detecting accuracy of the detecting element.

In the thus produced detecting element, the pores present in the bonding means in the form of the glass fillers 2, 2 for securing the conductors 3, 3 to the cylindrical support 1 serve as a low-conductivity portion which reduces the overall thermal conductivity of the glass fillers 2, 2, and consequently minimizes an amount of heat transfer from the alumina support 1 to the conductors 3, 3 through the glass fillers 2, 2, whereby the detecting accuracy and initial operating performance of the detecting element are effectively improved.

In the instant embodiment, the platinum connectors 5, 5 for electrically connecting the conductors 3, 3 to the platinum layer 4 also have pores therein, which minimize an amount of heat transfer or dissipation to the conductors 3, 3 through the connectors 5, 5. The presence of the pores in the connectors 5, 5 is particularly desirable to lower the thermal conductivity of the connectors, since the connectors 5, 5 provided in the present embodiment have a comparatively large area of contact with the support 1 and platinum layer 4.

Although the cylindrical support 1 for supporting the platinum layer 4 is formed of alumina in the instant embodiment, the support 1 may be formed of other ceramic materials such as aluminum nitride. In particular, the support 1 formed of aluminum nitride is advantageous for improved detecting accuracy and initial operating performance of the detecting element.

It will be also understood that the glass fillers 2, 2 provided as the bonding means for securing the conductors 3, 3 to the cylindrical support 1 may be formed of other bonding materials such as a glass ceramic. In the present embodiment, the pores are provided in the glass fillers 2, 2 as a low-conductivity portion having a lower thermal conductivity than the bonding material of which the fillers are formed. However, an inorganic particulate material such as zirconia ($ZrO_2$) having a lower thermal conductivity than the bonding material may be scattered in the glass fillers 2, 2, in place of or in addition to the pores.

Figure 2:
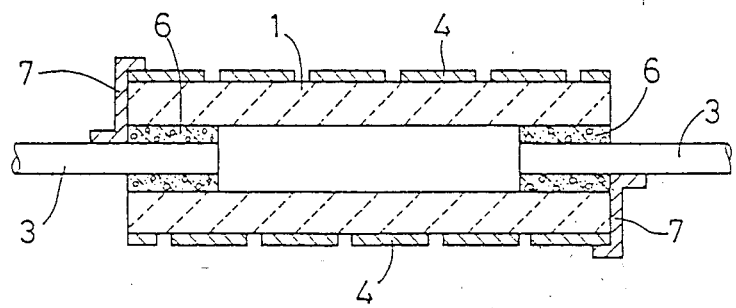

FIG. 2 shows a modification of the detecting element of FIG. 1, wherein glass fillers 6, 6 contain an inorganic particulate material. Described more specifically, the glass fillers 6, 6 for securing the conductors 3, 3 to the support 1 are formed in the same manner as described above, by firing masses of a glass paste which includes a zirconia ($ZrO_2$) powder having a particle size not greater than 10 microns, and which contains pores having a size not greater than 10 microns. In the instant case, the low-conductivity portion of the glass fillers 6, 6 is constituted by the pores formed in the glass and the $ZrO_2$ particles scattered in the glass. The $ZrO_2$ particles serve to increase the strength of the glass fillers 6, 6, as well as lower the thermal conductivity of the same, thereby increasing the durability of the detecting element as well as improving the detecting accuracy and initial operating performance.

In the instant embodiment of FIG. 2, platinum connectors 7, 7 for connecting the platinum layer 4 to the conductors 3, 3 have a reduced size, that is, a reduced area of contact with the cylindrical support 1, so that the amount of heat dissipation from the support 1 through the connectors 7, 7 is minimized.

Figure 3:
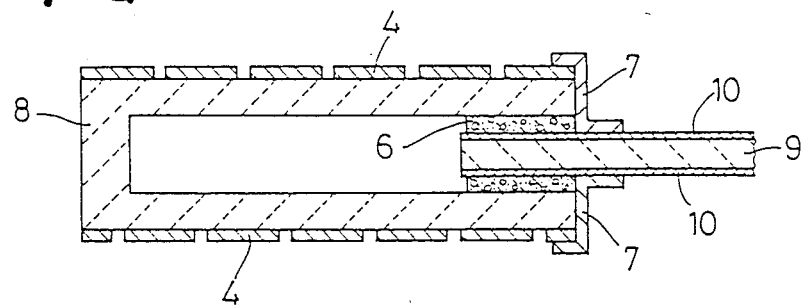

Referring to the cross sectional view of FIG. 3, there is illustrated a modification of the detecting element of FIG. 2, wherein the platinum layer 4 is formed on the outer circumferential surface of a tubular support 8 having a central bore which is closed at one of its opposite ends and open at the other end. The tubular support 8 is supported only at its open end. Described in greater detail, the platinum layer 4 consists of two spiral strips formed on the support 8 such that the two strips are connected at their left-hand side ends as seen in FIG. 3. The right-hand side ends of the two spiral strips are electrically connected to respective conductors 10, 10 through the respective separate connectors 7, 7 which are disposed at the open end of the tubular support 8. The conductors 10, 10 are supported by an insulating rod 9 which is inserted at its one end into the open end portion of the central bore of the tubular support 8 over a suitable distance. The inserted end portion of the insulating rod 9 is secured to the tubular support 8 by the glass filler 6 which includes a low-conductivity portion consisting of $ZrO_2$ particles and pores, as described above with respect to the embodiment of FIG. 2. The insulating rod 9 also functions to support the tubular support 8.

In the instant detecting element of FIG. 3 wherein the conductors 10, 10 are provided and fixed only at the open end of the tubular support 8, contrary to the conductors 3, 3 of FIGS. 1 and 2 provided at the opposite ends of the support 1, the amount of heat dissipation from the electrically resistive platinum layer 4 to the conductors 10, 10 is comparatively small, whereby the detecting accuracy and operating response of the detecting element are improved.

Figure 4:
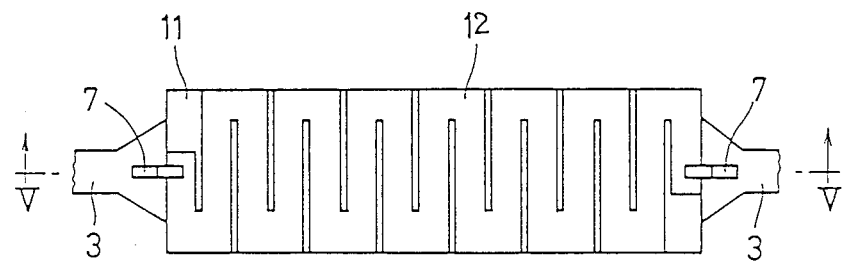
FIG. 4 is a plan view of another embodiment of the detecting element of the invention.
Figure 5:
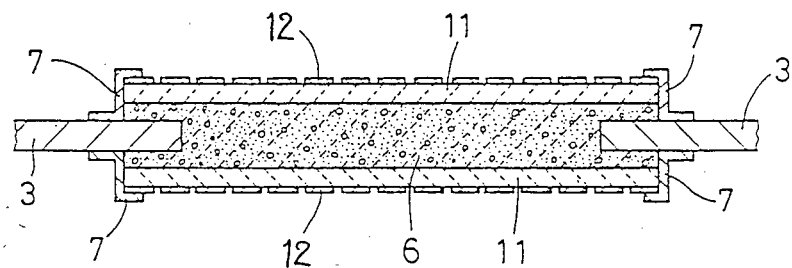
FIG. 5 is an elevational view in cross section taken along line V—V of FIG. 4.

Referring next to FIGS. 4 and 5, there is illustrated a further modified embodiment of the detecting element of the present invention, wherein a pair of alumina substrates 11, 11 are provided to support an electrically resistive body in the form of a pair of platinum layers 12, 12. Each platinum layer 12 is formed in a zigzag fashion on one of opposite major surfaces of the corresponding alumina substrate 11, as shown in FIG. 4. The two alumina substrates 11, 11 are disposed in spaced-apart relation with each other such that the other major surfaces face each other. A space between the two alumina substrates 11, 11 is filled by the planar glass filler 6 which includes the $ZrO_2$ particles and has pores therein. Thus, the two alumina substrates 11, 11 are integrated with each other. The conductors 3, 3 are embedded at their end portions in the corresponding end portions of the glass filler 6. The platinum layers 12, 12 formed on the outer surfaces of the substrates 11, 11 are electrically connected at their opposite ends to the respective conductors 3, 3, through the respective platinum connectors 7, 7.

Since the platinum layers 12, 12 serving as the electrically resistive body in the present embodiment are planar, the layers 12, 12 may be formed with improved accuracy. Namely, there exists a reduced variation in the operating characteristics of the individual detecting elements constructed according to the instant embodiment. Further, the planar configuration of the detecting element permits easy manufacture and installation of the element.

While the presently preferred embodiments of the detecting element of the invention have been described, the quantitative ratio of the low-conductivity portion of the bonding means for securing the conductor means to the support for the electrically resistive body is suitably determined according to the desired degree of reduction in the overall thermal conductivity of the bonding means. Where the bonding means is formed with pores as the low-conductivity portion, the porosity of the bonding means is generally held within a range of 10–80%, preferably 10–70%, from the standpoint of the initial operating time required before the output of the detecting element is stabilized, as indicated in Table 1. If the bonding means has a porosity exceeding 80%, the bonding strength of the bonding means is insufficient for securing the conductor means to the support, leading to insufficient durability and reliability of the detecting element.

TABLE 1

| Porosity (%) of Glass Filler | Required Initial Operating Time (ms) |
| --- | --- |
| 93 | 169 |
| 87 | 168 |
| 75 | 172 |
| 66 | 177 |
| 53 | 187 |
| 48 | 184 |
| 37 | 192 |
| 23 | 216 |
| 15 | 221 |
| 8 | 271 |

Table 1 shows the experimental results of different specimens of a thermal flow meter prepared according to the detecting element which uses the glass filler 2 as shown in FIG. 1. The glass fillers 2 of the specimens have different porosities as indicated in the table. The specimens were connected to a bridge circuit, and power was applied to the bridge circuit, with the detecting element placed in a non-flowing atmosphere. The required initial operating time, i.e., the length of time between the moment of the power application and the moment at which the output of the detecting element was stabilized was measured five times for each specimen. The average value of the five measurements of each specimen is indicated in Table 1. In the experiment, the detecting element of the specimens was self-heated to 100°–400° C.

While the present invention has been described in its preferred embodiments with a certain degree of particularity, by reference to the accompanying drawings, it is to be understood that the invention is not limited to the precise details of the illustrated embodiments, but the invention may be embodied with various changes, modifications and improvements which may occur to those skilled in the art, without departing from the spirit and scope of the invention.

Although the illustrated embodiments have been described as being adapted to be suitably used as a thermal flow meter, the principle of the invention may be applied to other types of sensors which utilizes temperature dependence of an electrically resistive body formed on the surface of a support structure. For instance, the present invention may be embodied as a temperature sensing element of a device for measuring the temperature of a gaseous fluid.

What is claimed is:

1. A detecting element for determining a parameter, comprising:
   a support having a bearing surface;
   an electrically resistive body formed on said bearing surface of said support;
   conductor means electrically connected to said electrically resistive body;
   bonding means for securing said conductor means to said support, said bonding means consisting of a porous glass structure which has pores formed therein as at least a part of a low-conductivity portion having a lower thermal conductivity than a remainder of said bonding means which consists of a glass.

2. A detecting element according to claim 1, wherein said porous glass structure has a porosity of 10–80%.

3. A detecting element according to claim 1, wherein said low-conductivity portion further comprises an inorganic particulate material scattered in said glass.

4. A detecting element according to claim 3, wherein said inorganic particulate material consists of a ceramic material.

5. A detecting element according to claim 4, wherein said ceramic material is zirconia.

6. A detecting element according to claim 1, wherein said support is formed of a ceramic material.

7. A detecting element according to claim 6, wherein said ceramic material consists of alumina.

8. A detecting element according to claim 6, wherein said ceramic material consists of aluminum nitride.

9. A detecting element according to claim 1, wherein said support consists of a cylindrical member which has a circumferential outer surface as said bearing surface on which said electrically resistive body is formed, said cylindrical member further having a bore in which said bonding means exists for securing said conductor means to said cylindrical member.

10. A detecting element according to claim 9, wherein said bore is formed through said cylindrical member, and said conductor means consists of two conductors whose end portions are inserted into open end portions of said bore.

11. A detecting element according to claim 10, further comprising two connectors for connecting opposite ends of said electrically resistive body to said two conductors, respectively.

12. A detecting element according to claim 11, wherein said connectors comprise a low-conductivity portion having a lower thermal conductivity than a remainder thereof.

13. A detecting element according to claim 9, wherein said bore is closed at one of opposite ends of said cylindrical member and open at the other end, said conductor means consists of a single conductor whose end portion is inserted into an open end portion of said bore.

14. A detecting element according to claim 13, further comprising connector means for connecting opposite ends of said electrically resistive body to said single conductor.

15. A detecting element according to claim 14, wherein said electrically resistive body consists of two members which are connected to each other at one of opposite ends of said cylindrical member, and connected to said connector means at the other end of said cylindrical member.

16. A detecting element according to claim 14, wherein said connector means comprises a low-conductivity portion having a lower thermal conductivity than a remainder thereof.

17. A detecting element according to claim 1, wherein said support comprises of a pair of planar members which are spaced apart from each other by said bonding means, and said electrically resistive body comprises two separate members each formed on one of opposite major surfaces of a corresponding one of said pair of planar members, said conductor means consisting of two conductors whose end portions are embedded in opposite end portions of said bonding means disposed between the other major surfaces of said pair of planar members.

18. A detecting element according to claim 17, further comprising two connectors for connecting the opposite ends of said two separate members of said electrically resistive body to said two conductors, respectively.

19. A detecting element for determining a parameter, comprising:
   a support having a bearing surface;
   an electrically resistive body formed on said bearing surface of said support;
   conductor means electrically connected to said electrically resistive body;
   bonding means for securing said conductor means to said support;
   connector means for connecting said electrically resistive body to said conductor means, said connector means consisting of a porous structure which consists essentially of a mixture of a metallic member and a glass material, said porous structure having a low-conductivity portion constituted by pores formed in said glass material.

20. A detecting element according to claim 19, wherein said bonding means consists of a porous glass structure which has pores formed therein as at least a part of a low-conductivity portion having a lower thermal conductivity that a remainder of said bonding means which consists of a glass.

21. A detecting element for determining a parameter, comprising:

a cylindrical support member having a bore formed therethrough, and a circumferential outer surface;

two electrically resistive members formed on said circumferential outer surface of said support member;

two conductors having end portions which are inserted into opposite open end portions of said bore;

two connectors for connecting said two electrically resistive members to said two conductors, respectively, each of said two connectors consisting of a porous structure which consists essentially of a mixture of a metallic material and a glass material, said porous structure having pores formed therein so as to provide a low-conductivity portion for reducing an amount of heat transfer from said two electrically resistive members and said support member to said two conductors; and two bonding fillers existing in said opposite open end portions of said bore of said cylindrical support member for securing said two conductors to said support member, each of said two bonding fillers consisting of a porous glass structure which has pores formed therein so as to provide a low-conductivity portion for reducing an amount of heat transfer from said support member to said two conductors.

* * * * *